(12) United States Patent
Tsuchiya

(10) Patent No.: US 11,529,758 B2
(45) Date of Patent: Dec. 20, 2022

(54) BLOW MOLDING METHOD, BLOW MOLDING MOLD, AND BLOW MOLDING APPARATUS

(71) Applicant: NISSEI ASB MACHINE CO., LTD., Nagano (JP)

(72) Inventor: Yoichi Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 17/041,751

(22) PCT Filed: Mar. 29, 2019

(86) PCT No.: PCT/JP2019/014164
§ 371 (c)(1),
(2) Date: Sep. 25, 2020

(87) PCT Pub. No.: WO2019/189819
PCT Pub. Date: Oct. 3, 2019

(65) Prior Publication Data
US 2021/0016488 A1    Jan. 21, 2021

(30) Foreign Application Priority Data

Mar. 30, 2018   (JP) .............................. JP2018-067639

(51) Int. Cl.
*B29C 49/48*      (2006.01)
*B29C 49/06*      (2006.01)
(Continued)

(52) U.S. Cl.
CPC .......... *B29C 49/4815* (2013.01); *B29C 49/06* (2013.01); *B29C 49/12* (2013.01);
(Continued)

(58) Field of Classification Search
CPC . B29C 49/0031; B29C 49/4815; B29C 49/48; B29C 49/4273; B29C 69/02; B29C 2049/4879
See application file for complete search history.

(56) References Cited

U.S. PATENT DOCUMENTS 4,035,461 A * 7/1977 Korth ...................... B29C 67/00
                                                                  264/296
4,584,158 A * 4/1986 Nilsson ................. B29C 49/642
                                                                  425/530
(Continued)

FOREIGN PATENT DOCUMENTS

CN          1777505 A      5/2006
CN        102922664 A      2/2013
(Continued)

OTHER PUBLICATIONS

Written Opinion of the International Searching Authority issued in International Patent Application No. PCT/JP2019/014164, dated Jun. 11, 201, along with an English Translation thereof.
(Continued)

*Primary Examiner* — Robert B Davis
(74) *Attorney, Agent, or Firm* — Greenblum & Bernstein, P.L.C.

(57) ABSTRACT

A blow mold method for a double-walled container, including: blowing in which an intermediate molded article is molded by stretch blowing a preform housed in a die; and pressing in which the intermediate molded article is pressed inside the die and a double-walled container is molded. During the pressing, an internal floor-corresponding section is pressed such that internal wall-corresponding section is inverted as far as the inside of an outer wall-corresponding section, in a state in which heat retention is maintained such
(Continued)

that the internal wall-corresponding section can be inverted as far as the inside of the outer wall-corresponding section.

5 Claims, 9 Drawing Sheets

(51) Int. Cl.
    *B29C 49/12*     (2006.01)
    *B29K 23/00*     (2006.01)
    *B29K 67/00*     (2006.01)
    *B29L 31/00*     (2006.01)
    *B65D 1/40*     (2006.01)

(52) U.S. Cl.
    CPC ...... *B29K 2023/06* (2013.01); *B29K 2023/12* (2013.01); *B29K 2067/003* (2013.01); *B29L 2031/712* (2013.01); *B65D 1/40* (2013.01)

(56) References Cited

U.S. PATENT DOCUMENTS

| | | | |
|---|---|---|---|
| 5,037,289 | A | 8/1991 | Ohta et al. |
| 9,339,979 | B2 | 5/2016 | Crawley |
| 2006/0141090 | A1 | 6/2006 | Lahouati |
| 2010/0092711 | A1 | 4/2010 | Atance Orden et al. |
| 2012/0328814 | A1 | 12/2012 | Atance Orden et al. |
| 2019/0261814 | A1* | 8/2019 | Crawley ............. B29C 49/4273 |

FOREIGN PATENT DOCUMENTS

| | | |
|---|---|---|
| JP | 39-29325 | 12/1939 |
| JP | 51-75760 A | 6/1976 |
| JP | 53-114870 A | 10/1978 |
| JP | 57-020330 A | 2/1982 |
| JP | 58-030969 A | 2/1983 |
| JP | 58-203022 A | 11/1983 |
| JP | 2-128826 A | 5/1990 |
| JP | H02-147322 | 6/1990 |
| JP | 2004-123146 A | 4/2004 |
| JP | 2016-182971 A | 10/2016 |

OTHER PUBLICATIONS

International Search Report issued in International Patent Application No. PCT/JP2019/014164, dated Jun. 11, 2019, along with an English translation thereof.

First Office Action dated Nov. 16, 2021 in the corresponding Chinese patent application 201980031157.1, along with an English translation thereof.

* cited by examiner

BLOW MOLDING METHOD, BLOW MOLDING MOLD, AND BLOW MOLDING APPARATUS

TECHNICAL FIELD

The present invention relates to a blow molding method, a blow molding mold, and a blow molding apparatus.

BACKGROUND ART

Patent Literature 1 and Patent Literature 2 disclose a method for producing a double-wall container via an intermediate molded product and a double-wall container produced by the method. Patent Literature 3 discloses a method for forming an arc-shaped bottom portion by, after molding a container, raising a bottom mold and pushing the bottom portion back inward, and a container including the arc-shaped bottom portion.

CITATION LIST

Patent Literature

Patent Literature 1: JP-A-S53-114870
Patent Literature 2: U.S. Pat. No. 9,339,979 specification
Patent Literature 3: JP-A-H02-128826

SUMMARY OF INVENTION

Technical Problem

Among containers into which hot coffee is put and the like, there is a cup type container having heat insulating effect (cold and heat retaining effect). In this type of container, a body portion or a bottom portion has a double-wall structure having an inner wall and an outer wall, and a proper space is formed between the inner wall and the outer wall to obtain heat insulating effect.

Generally, this type of container is produced by combining an inner container and an outer container, which are separately produced. However, since the number of parts is large, the handling and production process are complicated. Therefore, in recent years, a method has been devised that enables molding of a double-wall container from a single part. However, in this production method, an intermediate molded product with a bulged inner wall portion and a bulged bottom portion is prepared in a blow molding apparatus, and then the inner wall portion and the bottom portion are pressed and inverted in another apparatus to obtain the double-wall container, resulting in increasing steps. Therefore, there is room for improvement in terms of reduction in apparatus cost and production time.

An object of the present invention is to provide a blow molding method, a blow molding mold, and a blow molding apparatus which can simplify the production process and suitably produce a double-wall container.

Solution to Problem

A blow molding method for a double-wall container according to the present invention includes:
a blowing step of stretch-blowing a resin-made bottomed preform accommodated in a mold to mold an intermediate molded product; and
a pressing step of pressing the intermediate molded product in the mold to mold the double-wall container, in which
the double-wall container includes an inner wall, an outer wall, and an inner bottom,
the intermediate molded product includes a corresponding inner wall portion corresponding to the inner wall, a corresponding outer wall portion corresponding to the outer wall, and a corresponding inner bottom portion corresponding to the inner bottom,
the corresponding inner wall portion and the corresponding inner bottom portion are formed to bulge out from the corresponding outer wall portion,
in the pressing step, in a state where residual heat of the corresponding inner wall portion and the corresponding inner bottom portion is maintained such that the corresponding inner wall portion is capable of being inverted to be located in an inner side of the corresponding outer wall portion, the double-wall container is molded by pressing the corresponding inner bottom portion such that the corresponding inner wall portion formed to bulge out from the corresponding outer wall portion is inverted to be located in the inner side of the corresponding outer wall portion.

According to this blow molding method, it is possible to perform, in blow molding, the production of the intermediate molded product and the production of the double-wall container by pressing and inverting the corresponding inner wall portion and the corresponding inner bottom portion of the intermediate molded product. Accordingly, the production process can be simplified, and the double-wall container can be suitably produced.

In addition, a blow molding mold according to the present invention is a blow molding mold for use in a blow molding unit for producing a resin-made double-wall container from a preform via an intermediate molded product,
the double-wall container including an inner wall, an outer wall, and an inner bottom,
the intermediate molded product including a corresponding inner wall portion corresponding to the inner wall, a corresponding outer wall portion corresponding to the outer wall, and a corresponding inner bottom portion corresponding to the inner bottom,
the corresponding inner wall portion and the corresponding inner bottom portion being formed to bulge out from the corresponding outer wall portion,
the mold including:
a cavity mold configured to define outer shapes of the corresponding inner wall portion and the corresponding outer wall portion of the intermediate molded product, the intermediate molded product being molded by blowing and stretching the preform with a stretching rod provided in the blow molding unit; and
a bottom portion configured to define an outer shape of the corresponding inner bottom portion of the intermediate molded product, in which
in a state where residual heat of the corresponding inner wall portion and the corresponding inner bottom portion is maintained such that the corresponding inner wall portion is capable of being inverted to be located in an inner side of the corresponding outer wall portion, the bottom portion is capable of pressing the corresponding inner bottom portion such that the corresponding inner wall portion formed to bulge out from the corresponding outer wall portion is inverted to be located in the inner side of the corresponding outer wall portion.

According to this blow molding mold, it is possible to perform, in the blow molding mold, the production of the intermediate molded product and the production of the double-wall container by pressing and inverting the corresponding inner wall portion and the corresponding inner bottom portion of the intermediate molded product. Accordingly, the production process can be simplified, and the double-wall container can be suitably produced.

In addition, in the blow molding mold, the bottom portion may be a bottom mold, and the bottom mold may be movable up and down in a stretching direction of the stretching rod.

In addition, in the blow molding mold, the bottom portion may include a bottom mold and an elevation rod attached to the bottom mold, and the elevation rod may be movable up and down in the stretching direction of the stretching rod.

Further, a blow molding apparatus according to the present invention includes:

an injection molding unit configured to produce a resin-made bottomed preform; and a blow molding unit configured to produce a resin-made double-wall container, via an intermediate molded product, from the preform produced in the injection molding unit, in which the blow molding unit includes the mold and the stretching rod configured to stretch the preform.

According to this blow molding apparatus, it is possible to perform, in the blow molding unit, the production of the intermediate molded product and the production of the double-wall container by pressing and inverting the corresponding inner wall portion and the corresponding inner bottom portion of the intermediate molded product. Accordingly, the production process can be simplified, and the double-wall container can be suitably produced.

Advantageous Effects of Invention

According to the present invention, it is possible to provide a blow molding method, a blow molding mold, and a blow molding apparatus which can simplify the production process and suitably produce a double-wall container.

DESCRIPTION OF EMBODIMENTS

Figure 1:
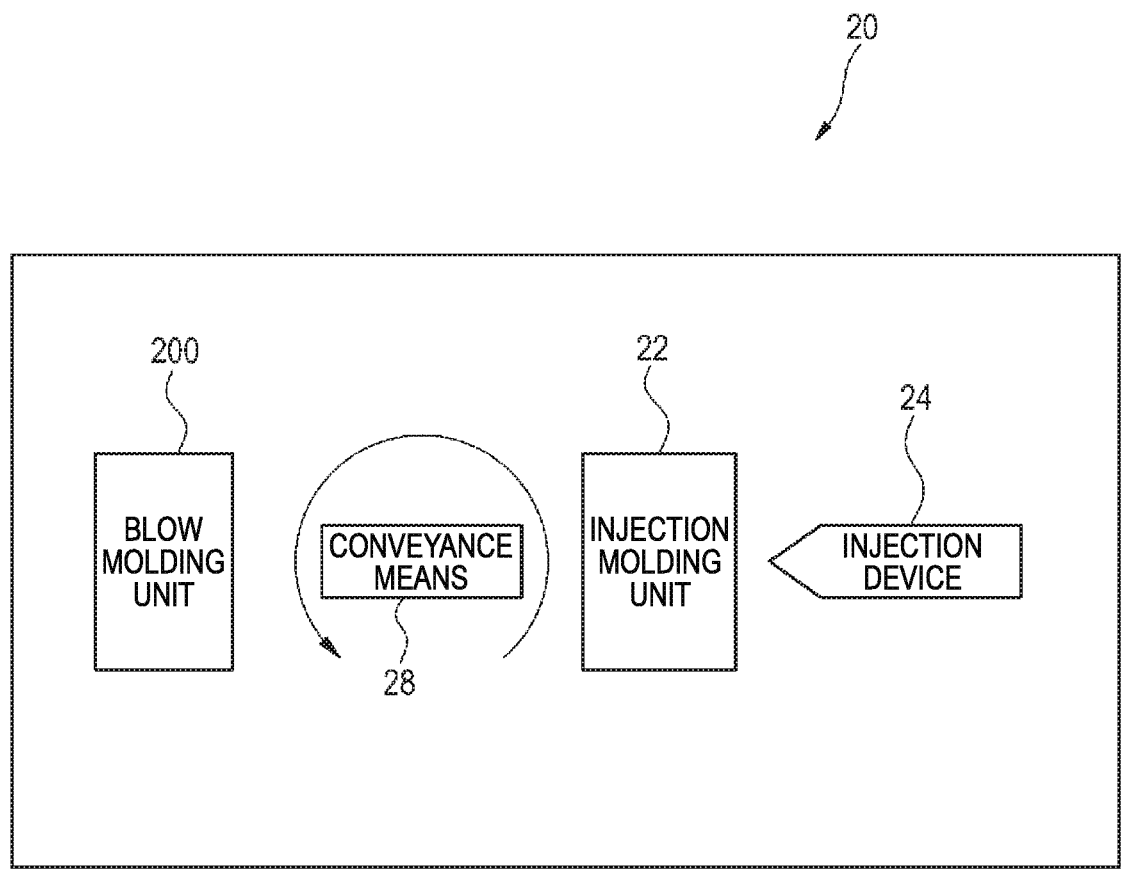
FIG. 1 is a functional block diagram showing a blow molding apparatus according to an embodiment.

Hereinafter, an example of an embodiment of the present invention will be described with reference to the drawings. Dimensions of each member shown in the drawings may be different from the actual dimensions of each member for convenience of description. First, with reference to FIG. 1, a blow molding apparatus 20 for producing a resin-made double-wall container 10 will be described. FIG. 1 is a functional block diagram of the blow molding apparatus 20.

As shown in FIG. 1, the blow molding apparatus 20 includes an injection molding unit 22 for producing a preform 1. The injection molding unit 22 is connected to an injection device 24 for supplying a resin material as a raw material. Materials such as polypropylene, polyethylene, and polyethylene terephthalate can be used as the resin material. In addition, the blow molding apparatus 20 includes a blow molding unit 200 for producing the double-wall container 10 by blowing the preform 1.

The injection molding unit 22 and the blow molding unit 200 are provided at positions rotated by a predetermined angle (180 degrees in the present embodiment) about a conveying means 28. The conveying means is constituted by a rotary plate or the like, and is configured to convey the preform 1 or the double-wall container 10 in a state where a neck portion is supported by a neck mold 2 (see FIG. 2) attached to the rotary plate as the rotary plate rotates.

The injection molding unit 22 shown in FIG. 1 includes an injection cavity mold, an injection core mold, a neck mold, and the like, which are not shown. A resin material from the injection device 24 is poured into a preform-shaped space formed by clamping these molds, and thereby the bottomed preform 1 is produced.

The blow molding unit 200 is configured to produce the double-wall container 10, via an intermediate molded product 60, from the preform 1 produced by the injection molding unit 22. Here, the double-wall container 10, the intermediate molded product 60, and the blow molding unit 200 will be described in detail with reference to FIG. 2 to FIG. 4.

Figure 2:
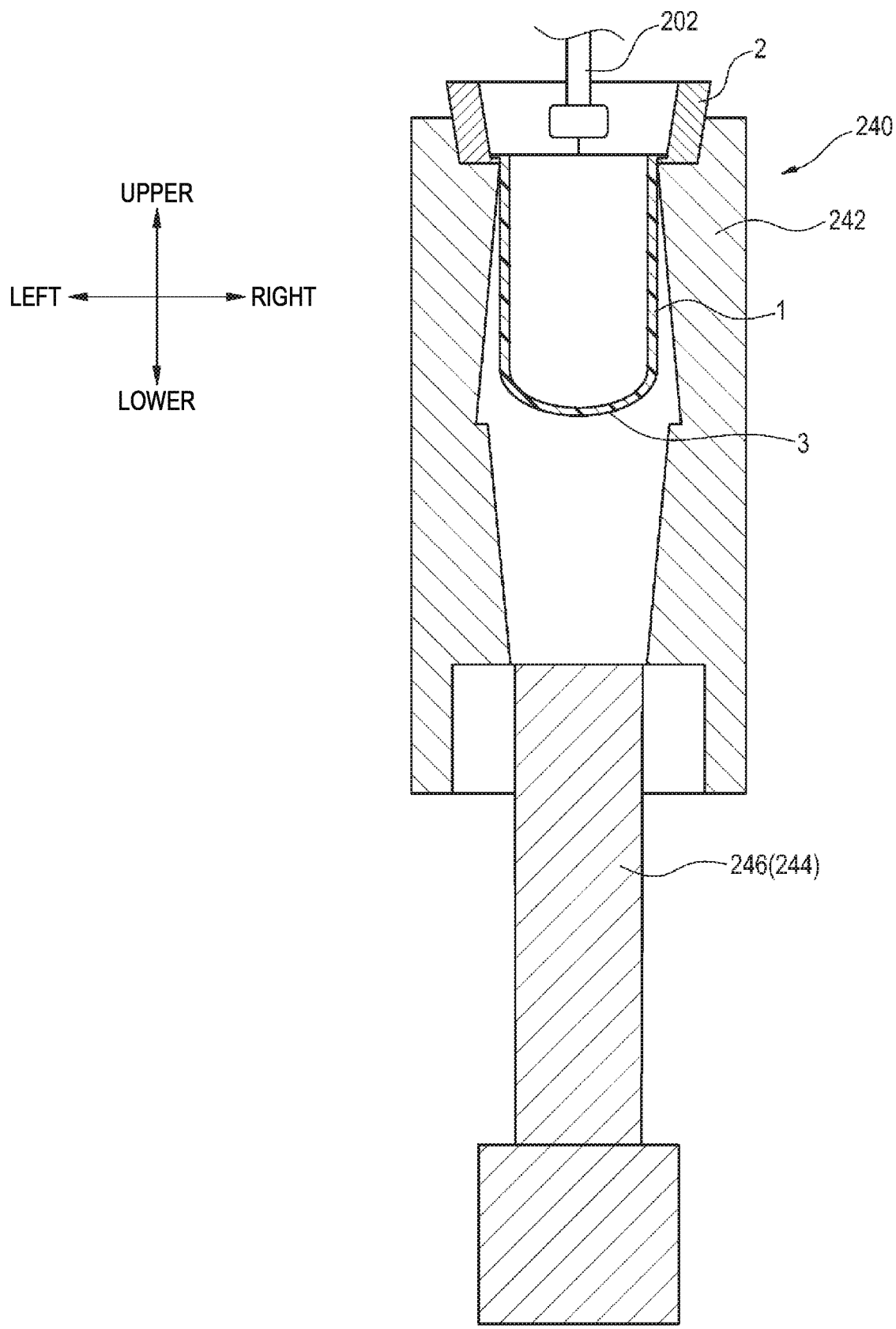
FIG. 2 is a schematic cross-sectional view showing one mode of a blow molding unit in a state where a preform is accommodated therein.
Figure 3:
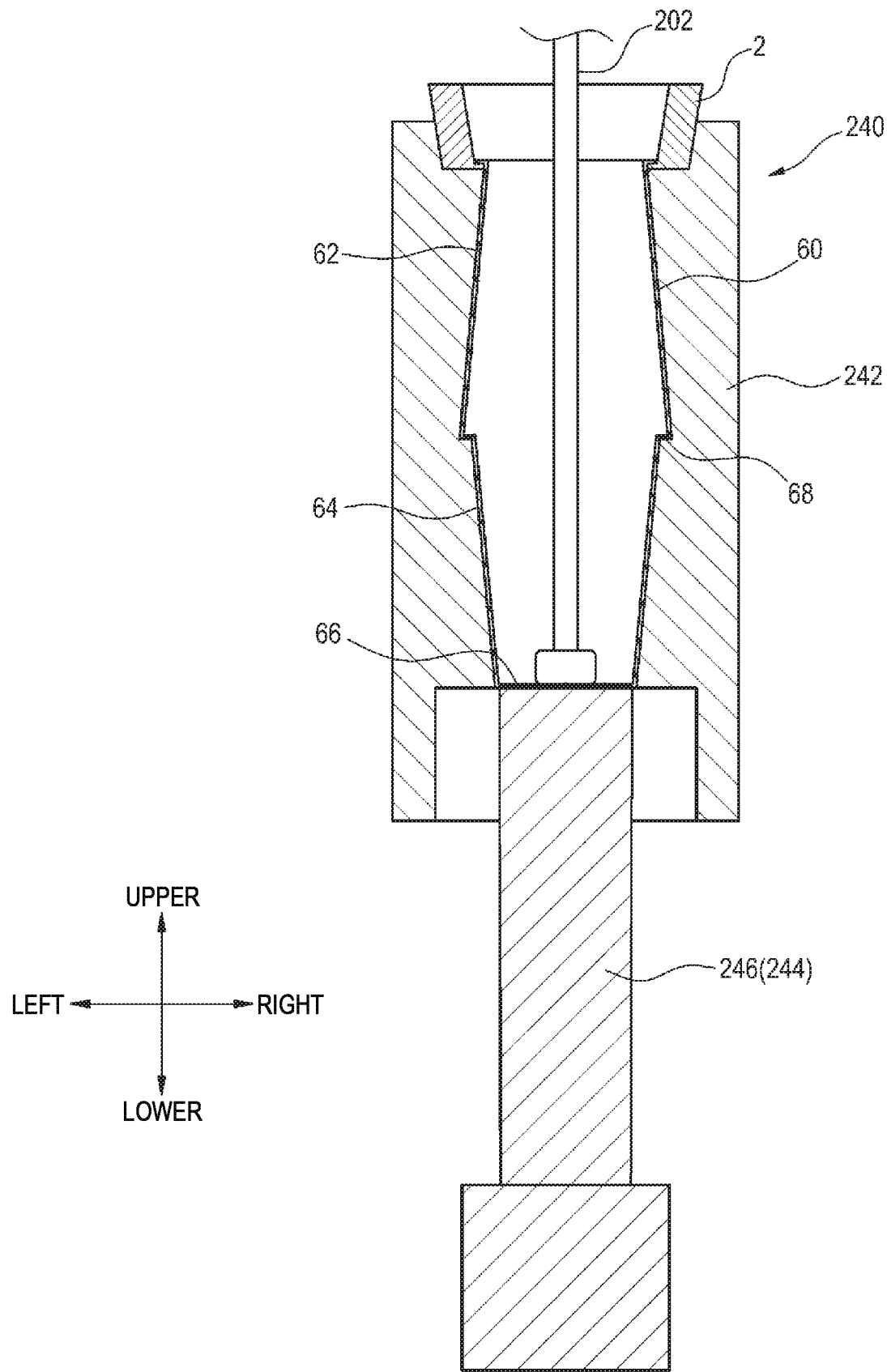
FIG. 3 is a schematic cross-sectional view showing one mode of the blow molding unit in a state where an intermediate molded product is molded therein.
Figure 4:
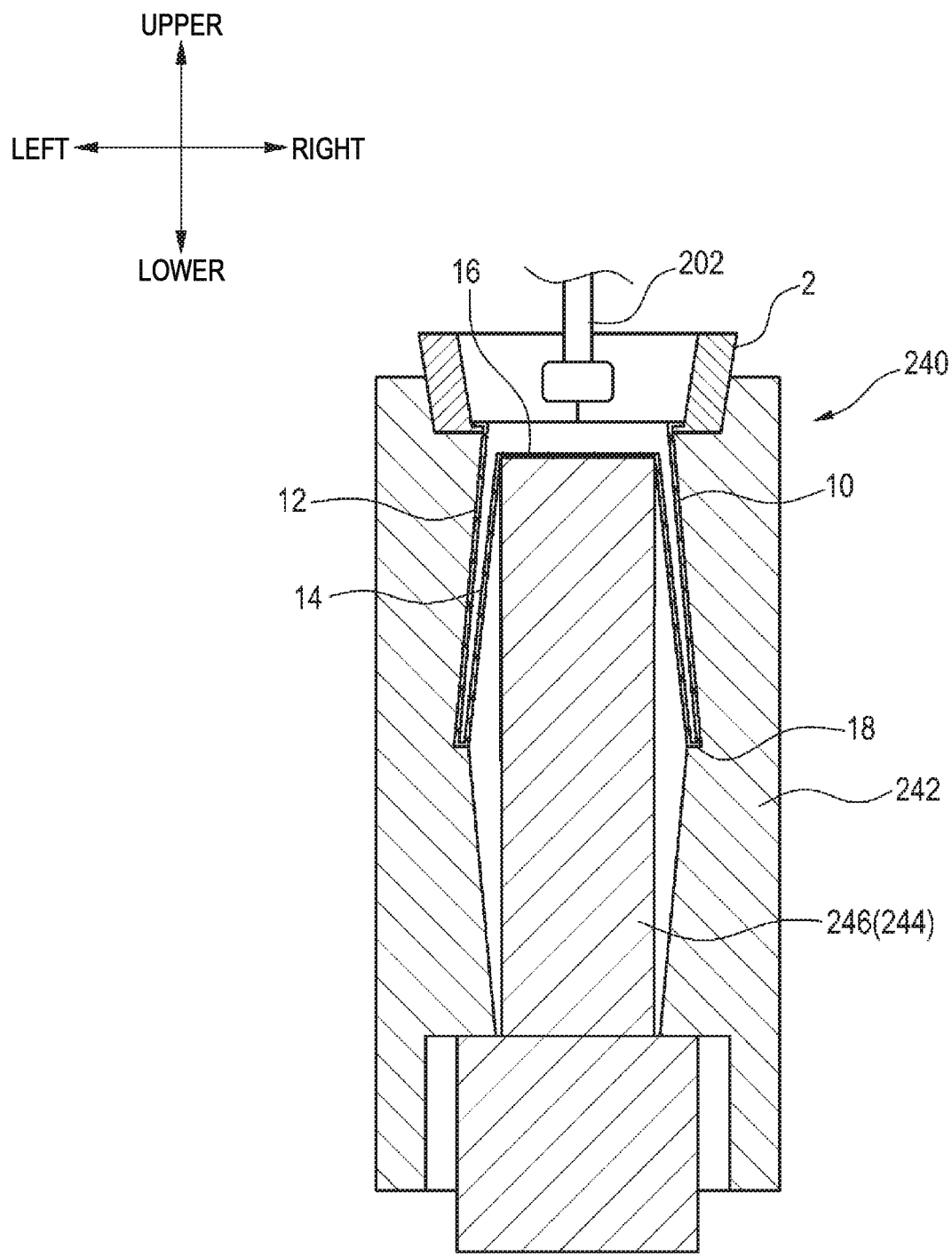
FIG. 4 is a schematic cross-sectional view showing one mode of the blow molding unit in a state where a double-wall container is molded therein.

FIG. 2 to FIG. 4 are schematic cross-sectional views showing states of the blow molding unit 200 for producing, via the intermediate molded product 60, the double-wall container 10 from the preform 1. Details of each stage of FIG. 2 to FIG. 4 will be described later.

The double-wall container 10 molded in the blow molding unit 200 is a container including an inner wall 14, an outer wall 12, an inner bottom 16, and an edge 18 (see FIG. 4). The inner wall 14 is configured to be continuous with the inner bottom 16. The inner wall 14 is configured to be continuous with the outer wall 12 via the edge 18. In FIG. 4, an interval between left and right sides of the inner wall 14 becomes narrower from a lower portion toward an upper portion, and the inner wall 14 is inclined from the lower portion to the upper portion. In addition, in FIG. 4, like the inner wall 14, an interval between the left and right sides of the outer wall 12 also becomes narrower from the lower portion to the upper portion, and the outer wall 12 is also inclined from the lower portion to the upper portion.

The inner bottom 16 is formed to connect left and right upper ends of the inner wall 14 in FIG. 4. In FIG. 4, the interval between the left and right sides of the inner wall 14 is smaller than the interval between the left and right sides of the outer wall 12, and the inner wall 14 is arranged on an inner side of the outer wall 12. A space is formed between the inner wall 14 and the outer wall 12. In FIG. 4, left and right upper ends of the outer wall 12 are not connected to each other, and an outer bottom of the double-wall container 10 is open. A medium such as air enters the space between the inner wall 14 and the outer wall 12, which results in heat insulating effect. The double-wall container 10 can be used for applications such as a coffee cup.

The intermediate molded product 60 molded by blowing the preform 1 includes a corresponding inner wall portion 64, a corresponding outer wall portion 62, a corresponding inner bottom portion 66, and a corresponding edge portion 68 (see FIG. 3). The corresponding inner wall portion 64 is a portion corresponding to the inner wall 14 of the double-wall container 10 to be formed in a subsequent step. The corresponding outer wall portion 62 is a portion corresponding to the outer wall 12 of the double-wall container 10. The corresponding inner bottom portion 66 is a portion corresponding to the inner bottom 16 of the double-wall container 10. The corresponding edge portion 68 is a portion corresponding to the edge 18 of the double-wall container 10. The corresponding inner wall portion 64 is configured to be continuous with the corresponding inner bottom portion 66. The corresponding inner wall portion 64 is configured to be continuous with the corresponding outer wall portion 62 via the corresponding edge portion 68.

The corresponding inner wall portion 64 and the corresponding inner bottom portion 66 bulge out downward in FIG. 3 from the corresponding outer wall portion 62 and the corresponding edge portion 68. An interval between left and right ends of the corresponding edge portion 68 at the corresponding inner wall portion 64 is smaller than an interval between the left and right ends of the corresponding edge portion 68 at the corresponding outer wall portion 62. In FIG. 3, an interval between the left and right sides of the corresponding inner wall portion 64 becomes narrower from the upper portion toward the lower portion, and the corresponding inner wall portion 64 is inclined from the upper portion to the lower portion. In addition, in FIG. 3, an interval between the left and right sides of the corresponding outer wall portion 62 becomes narrower from the lower portion toward the upper portion, and the corresponding outer wall portion 62 is inclined from the lower portion to the upper portion. In FIG. 3, left and right upper ends of the corresponding outer wall portion 62 are not connected to each other but are open.

The blow molding unit 200 includes a mold 240 and a stretching rod 202 configured to stretch the preform 1 (see FIG. 2 to FIG. 4). The stretching rod 202 is movable in an upper-lower direction in FIG. 2 to FIG. 4. The mold 240 includes a cavity mold 242 configured to define outer shapes of the corresponding inner wall portion 64, the corresponding outer wall portion 62, and the corresponding edge portion 68 of the intermediate molded product 60, and a bottom portion 244 configured to define an outer shape of the corresponding inner bottom portion 66 of the intermediate molded product 60. The cavity mold 242 is a split mold, and is configured to open and close according to the accommodation of the preform 1 and the removal of the double-wall container 10.

The bottom portion 244 is capable of pressing the corresponding inner bottom portion 66 such that the corresponding inner wall portion 64 formed to bulge out downward from the corresponding outer wall portion 62 and the corresponding edge portion 68 is inverted to be located in an inner side of the corresponding outer wall portion 62. In the present embodiment, the bottom portion 244 is a bottom mold 246, and the bottom mold 246 is movable up and down in a stretching direction of the stretching rod 202. The bottom mold 246 is capable of pressing the corresponding inner bottom portion 66 from the states shown in FIG. 2 and FIG. 3 to a position between a position above the corresponding edge portion 68 in FIG. 4 and a position below an upper end portion of the corresponding outer wall portion 62. An elevation distance of the bottom mold 246 can be appropriately changed according to a desired depth of the inner bottom 16 of the double-wall container 10.

Next, a blow molding method for the double-wall container 10 will be described with reference to FIG. 2 to FIG. 4. The blow molding method according to the present embodiment includes a blowing step of stretch-blowing the preform 1 accommodated in the mold 240 to mold the intermediate molded product 60 (see FIG. 2 and FIG. 3), and a pressing step of pressing the intermediate molded product 60 in the mold 240 to mold the double-wall container 10 (see FIG. 3 and FIG. 4).

In the blowing step, first, the preform 1 molded by the injection molding unit 22 is conveyed by the conveying means 28, and then is disposed in the cavity mold 242 of the mold 240 of the blow molding unit 200 in an open state. Then, the cavity mold 242 is closed and the preform 1 is accommodated in the mold 240 (FIG. 2).

Next, the preform 1 is stretched in a downward direction in FIG. 2 by using the stretching rod 202, and is blown with a blow medium to mold the intermediate molded product 60 (FIG. 3). A gas such as air can be used as the blow medium. A liquid such as water may be used, or a mixed medium of gas and liquid may be used. At this time, residual heat of the corresponding inner wall portion 64 and the corresponding inner bottom portion 66 is maintained such that the corresponding inner wall portion 64 is capable of being inverted to be located in the inner side of the corresponding outer wall portion 62.

The "residual heat" means the heat remained in each portion of the intermediate molded product 60. For example, the heat remained during the molding of the preform 1 in the injection molding unit is a large, and in this state, shaping of the molded product can be easily performed. On the other hand, when the residual heat is small, it is difficult to shape the molded product. The expression "residual heat of the corresponding inner wall portion 64 and the corresponding inner bottom portion 66 is maintained such that the corresponding inner wall portion 64 is capable of being inverted to be located in the inner side of the corresponding outer wall portion 62" means that an amount of heat under which the double-wall container 10 can be shaped by inverting the corresponding inner wall portion 64 of the intermediate molded product 60 to be located in the inner side of the corresponding outer wall portion 62 is remained in the corresponding inner wall portion 64 and the corresponding inner bottom portion 66 until the subsequent pressing step.

Generally, in a hot parison type blow molding method, a thick part of the preform tends to be easily stretched since the thick part has a larger amount of heat (high temperature) than that of a thin part, the corresponding part after blowing is thinner than other parts, and the residual heat thereof is remarkably reduced. Therefore, for example, when a thickness of a lower portion 3 (a portion to be the corresponding inner wall portion 64 and the corresponding inner bottom portion 66) of the preform 1 is made relatively thinner than a thickness of an upper portion (a portion to be the corresponding outer wall portion 62) thereof, the residual heat of the corresponding inner wall portion 64 and the corresponding inner bottom portion 66 of the intermediate molded product 60 can be maintained. It is desirable to reverse the above thickness distribution in a cold parison type blow molding method. In addition, for example, when the lower portion 3 of the preform 1 is cooled to a relatively lower temperature than the upper portion immediately before accommodating the preform 1 in the blow molding unit 200, the residual heat of the corresponding inner wall portion 64 and the corresponding inner bottom portion 66 of the intermediate molded product 60 can also be maintained. Further, for example, when a portion of the cavity mold 242 of the mold 240, which defines the outer shape of the corresponding inner wall portion 64, and the bottom portion 244 have a temperature adjustment function, the residual heat of the corresponding inner wall portion 64 and the corresponding inner bottom portion 66 of the intermediate molded product 60 can also be maintained.

In the blowing step, immediately after molding the intermediate molded product 60, the corresponding inner bottom portion 66 is pressed by the bottom mold 246 in the mold 240 in a state where the residual heat of the corresponding inner wall portion 64 and the corresponding inner bottom portion 66 is maintained such that the corresponding inner wall portion 64 is capable of being inverted to be located in the inner side of the corresponding outer wall portion 62. At this time, the stretching rod 202 is also raised. Alternatively, the stretching rod 202 may be raised in advance before the pressing is started. Then, the corresponding inner wall portion 64 formed to bulge out from the corresponding outer wall portion 62 by pressing with the bottom mold 246 is inverted to be located in the inner side of the corresponding outer wall portion 62 (FIG. 4). After this step, the double-wall container 10 is molded. After molding, the bottom mold 246 is lowered to open the cavity mold 242 to open the double-wall container 10, and the neck mold 2 is opened to obtain the double-wall container 10. When a liquid or a mixed medium of gas and liquid is used as the blow medium, the blow medium may be collected before the neck mold 2 is opened.

For a double-wall container produced by combining an inner container and an outer container, which are separately produced, since the number of parts is large, handling the parts and production process are complicated. In addition, there is also a method of preparing an intermediate molded product from a single part with a bulged inner wall portion and a bulged bottom portion in a blow molding machine and then pressing and inverting the inner wall portion and the bottom portion in another apparatus to obtain the double-wall container. However, since separate apparatuses are used, steps are increased. When the intermediate molded product is moved from the blow molding machine to the other apparatus, the residual heat of the intermediate molded product is lost, and it is necessary to additionally heat the intermediate molded product before the double-wall container is molded in the other apparatus.

In the blow molding method according to the present embodiment, the blowing step of molding the intermediate molded product 60 and the pressing step of molding the double-wall container 10 are performed in the mold 240 for use in blow molding. Then, in the pressing step, the residual heat of the corresponding inner wall portion 64 and the corresponding inner bottom portion 66 is maintained also after the blowing step such that the corresponding inner wall portion 64 is capable of being inverted to be located in the inner side of the corresponding outer wall portion 62, and thereby the double-wall container 10 can be molded from the intermediate molded product 60 in the mold 240. Accordingly, the production of the intermediate molded product 60 and the production of the double-wall container 10 by pressing and inverting the corresponding inner wall portion 64 and the corresponding inner bottom portion 66 of the intermediate molded product 60 can be performed in the blow molding, the production process can be simplified, and the double-wall container 10 can be suitably produced.

In addition, the blow molding mold 240 according to the present embodiment includes the cavity mold 242 configured to define the outer shapes of the corresponding inner wall portion 64 and the corresponding outer wall portion 62 of the intermediate molded product 60, and the bottom portion 244 configured to define the outer shape of the corresponding inner bottom portion 66 of the intermediate molded product 60. Further, in a state where the residual heat of the corresponding inner wall portion 64 and the corresponding inner bottom portion 66 is maintained such that the corresponding inner wall portion 64 is capable of being inverted to be located in the inner side of the corresponding outer wall portion 62, the bottom portion 244 is capable of pressing the corresponding inner bottom portion 66 such that the corresponding inner wall portion 64 is inverted to be located in the inner side of the corresponding outer wall portion 62. Accordingly, after the preform 1 is stretched and blown to produce the intermediate molded product 60, the corresponding inner bottom portion 66 of the intermediate molded product 60 can be pressed by the bottom portion 244. Then, the corresponding inner wall portion 64 and the corresponding inner bottom portion 66 of the intermediate molded product 60 can be pressed and inverted to produce the double-wall container 10. The production of the intermediate molded product 60 and the production of the double-wall container 10 can be performed in the mold 240, the production process can be simplified, and the double-wall container 10 can be suitably produced.

The blow molding apparatus 20 according to the present embodiment includes the mold 240 including the cavity mold 242 configured to define the outer shapes of the corresponding inner wall portion 64 and the corresponding outer wall portion 62 of the intermediate molded product 60 and the bottom portion 244 configured to define the outer shape of the corresponding inner bottom portion 66 of the intermediate molded product 60. Further, in a state where the residual heat of the corresponding inner wall portion 64 and the corresponding inner bottom portion 66 is maintained such that the corresponding inner wall portion 64 is capable of being inverted to be located in the inner side of the corresponding outer wall portion 62, the bottom portion 244 is capable of pressing the corresponding inner bottom portion 66 such that the corresponding inner wall portion 64 is inverted to be located in the inner side of the corresponding outer wall portion 62. Accordingly, after the preform 1 is stretched and blown to produce the intermediate molded product 60, the corresponding inner bottom portion 66 of the intermediate molded product 60 can be pressed by the bottom portion 244. Then, the corresponding inner wall portion 64 and the corresponding inner bottom portion 66 of the intermediate molded product 60 can be pressed and inverted to produce the double-wall container 10. The production of the intermediate molded product 60 and the production of the double-wall container 10 can be performed in the blow molding unit 200, the production process can be simplified, and the double-wall container 10 can be suitably produced.

Figure 5:
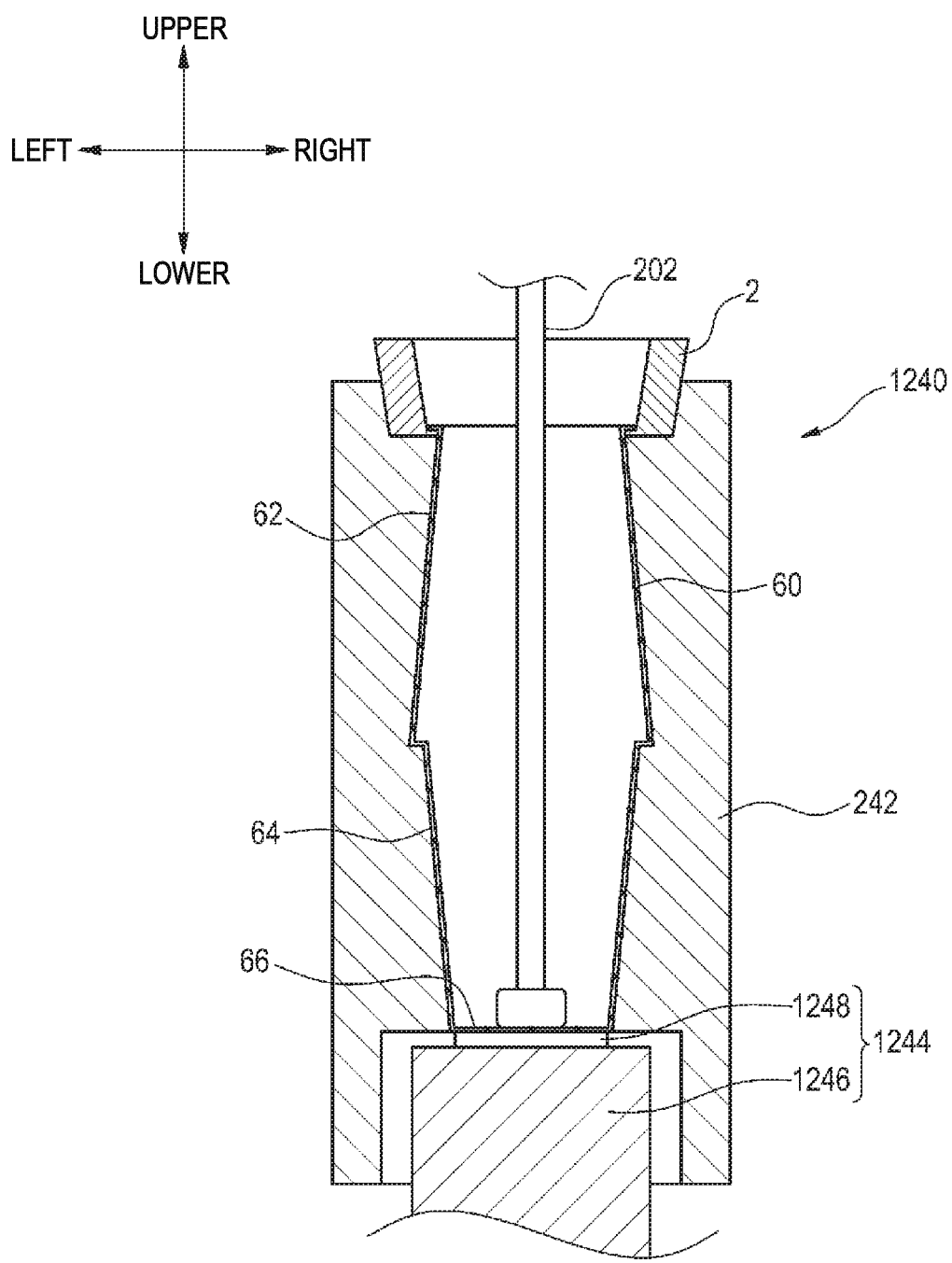
FIG. 5 is a schematic cross-sectional view showing another mode of the blow molding unit in the state where the intermediate molded product is molded therein.
Figure 6:
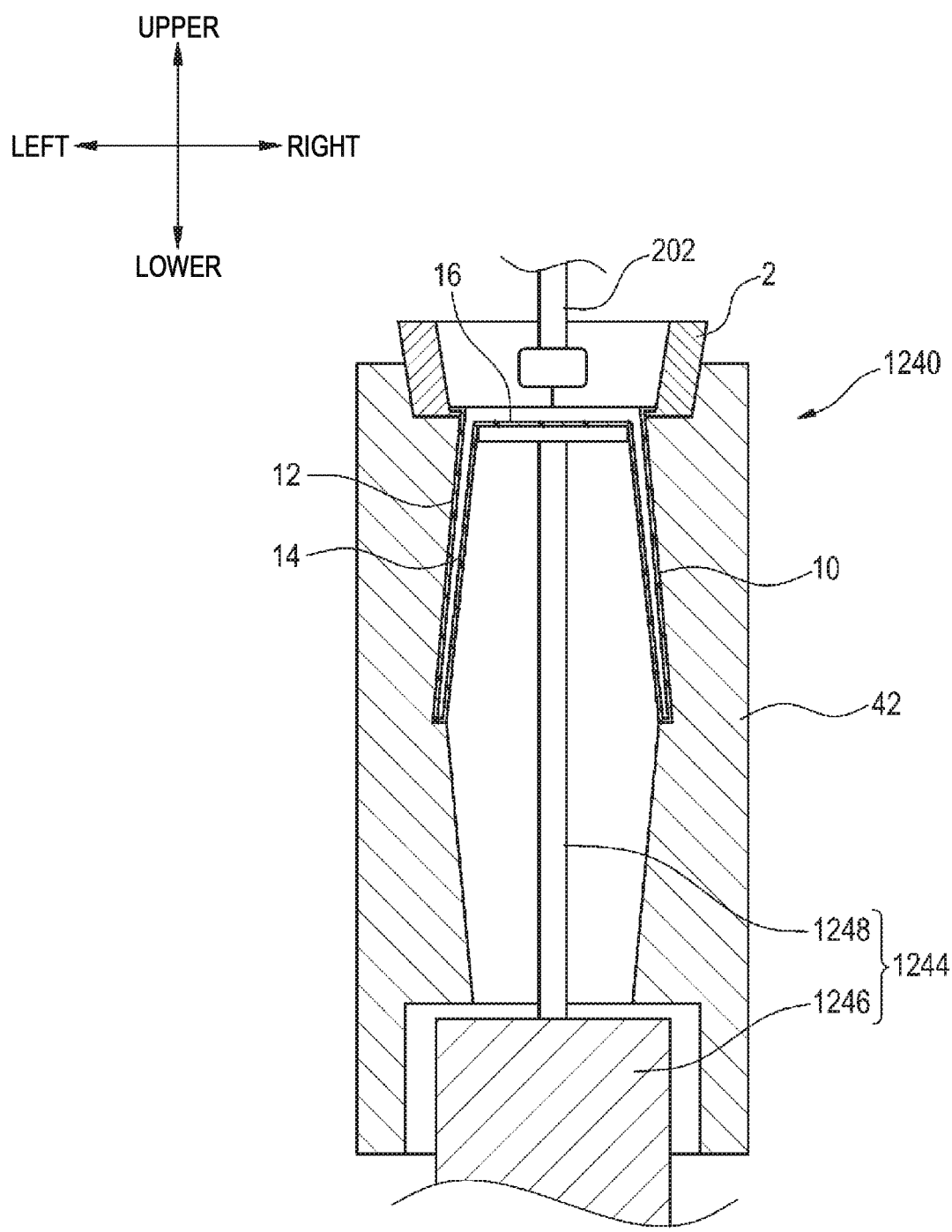
FIG. 6 is a schematic cross-sectional view showing another mode of the blow molding unit in the state where the double-wall container is molded therein.

In the above embodiment, the bottom portion 244 is configured by the bottom mold 246. On the other hand, as shown in FIG. 5, a bottom portion 1244 may include a bottom mold 1246 and an elevation rod 1248 attached to the bottom mold 1246. FIG. 5 and FIG. 6 are diagrams for explaining another mode of the above embodiment. The mold 1240 shown in FIG. 5 is similar to the mold described in the above embodiment except for the bottom portion 1244, and therefore the description thereof is omitted. The elevation rod 1248 is movable up and down in the stretching direction of the stretching rod 202. The elevation rod 1248 is capable of pressing the corresponding inner bottom portion 66 of the intermediate molded product 60 to mold the double-wall container 10 (FIG. 6). Accordingly, the effects same as those of the above embodiment can be obtained.

Figure 7:
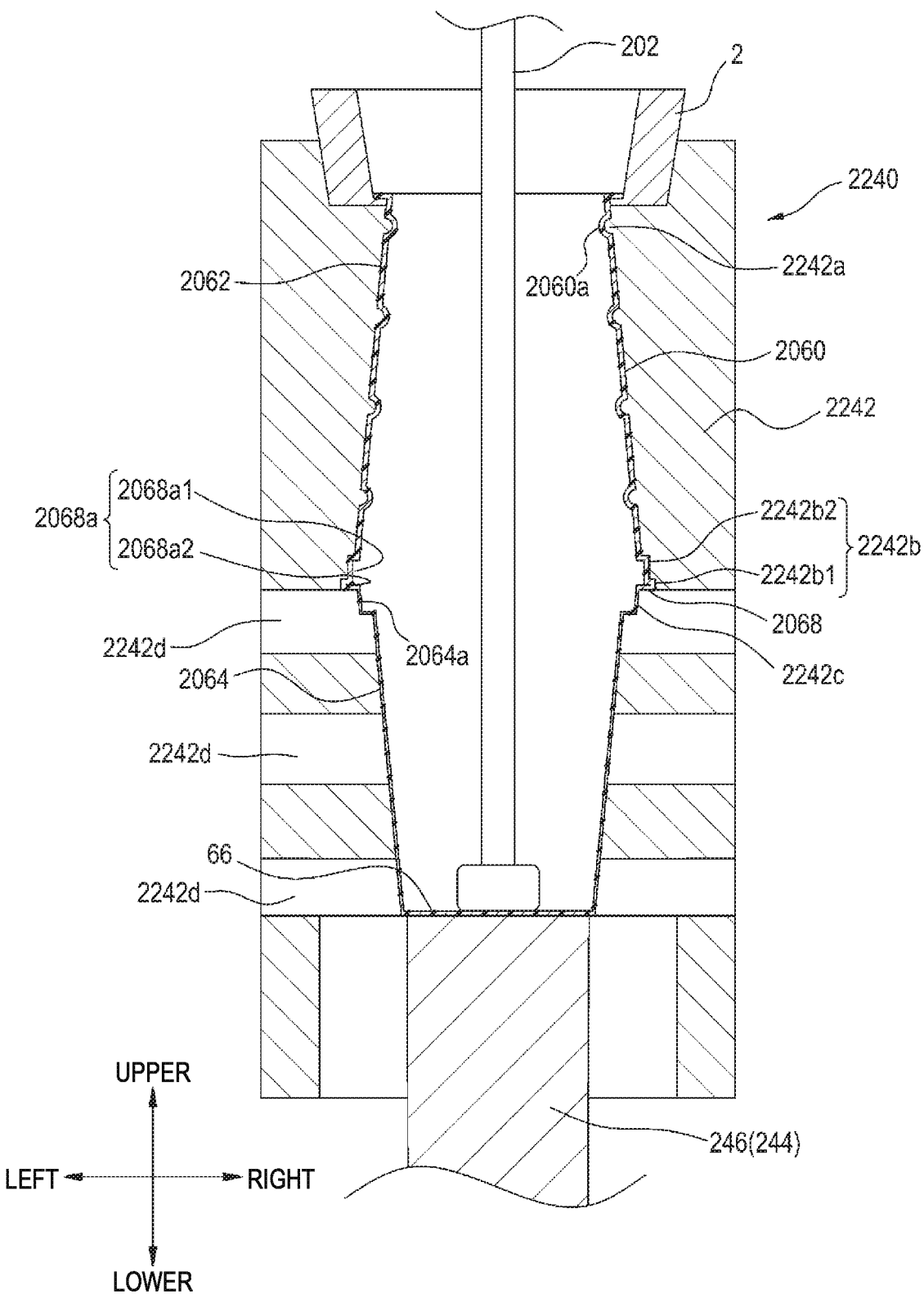
FIG. 7 is a schematic cross-sectional view showing still another mode of the blow molding unit in the state where the intermediate molded product is molded therein.

In addition, still another mode is shown in FIG. 7. FIG. 7 is a schematic cross-sectional view showing the blow molding unit in a state where an intermediate molded product 2060 is molded therein. In FIG. 7, components same as those in the above embodiment are designated by the same reference numerals and the description thereof is omitted. In the intermediate molded product 2060, a corresponding outer wall portion 2062 and a corresponding edge portion 2068 are formed to be thicker than a corresponding inner wall portion 2064. For example, it is preferable that an average thickness of a body portion of the corresponding outer wall portion 2060 and the corresponding edge portion 2068 is 1.2 times or more thicker than that of the corresponding inner wall portion 2064. Accordingly, the corresponding inner wall portion 2064 can be easily pressed and inverted. In addition, after high-pressure air (for example, 3.5 MPa or less (1.6 MPa to 3.5 MPa)) is exhausted, low-pressure air (for example, 1.5 MPa or less (0.3 MPa to 1.5 MPa)) may be introduced into the intermediate container 2060 to be pressurized and then inverted. Accordingly, irregular deformation of the corresponding edge portion 2068 during pressing and inverting can be prevented. For example, the low-pressure air may be introduced when the stretching rod 202 is lower than the corresponding edge portion 2068, and the high-pressure air may be introduced when the stretching rod is lower than an intermediate position of the corresponding inner wall portion 2064. Accordingly, the thickness distribution and shapeability of the intermediate molded product 2060 can be improved. In addition, in order to make it easy to press and invert the corresponding inner wall portion 2062, a step portion 2064a may be provided in the vicinity of the corresponding edge portion 2068 (a corresponding portion of a cavity mold 2242 is a concave portion 2242c). Accordingly, the corresponding inner wall portion 2062 during pressing and inverting can be inverted stepwise. Naturally, these configurations can be adopted in modes other than the mode shown in FIG. 7, and can be applied to the mode shown in FIG. 3 and FIG. 4, and the mode shown in FIG. 5 and FIG. 6.

In the mode shown in FIG. 7, in order to improve the strength (rigidity) of the corresponding outer wall portion 2062, a concave rib 2060a is provided (a corresponding portion of the cavity mold 2242 is a convex portion 2242a). Accordingly, deformation of the corresponding outer wall portion 2062 during pressing and inverting can be prevented. Further, a flange portion 2068b is provided in order to improve the strength of the corresponding edge portion 2068. The flange portion 2068b includes a first flange portion 2068b1 and a second flange portion 2068b2 (corresponding portions of the cavity mold 2242 are concave portions 2242b (2242b1, 2242b2)). The second flange portion 2068a2 reinforces the first flange portion 2068a1. Further, the concave rib 2060a may be provided in the vicinity of the second flange portion 2068a2 in order to increase the strength. Accordingly, irregular deformation of the corresponding edge portion 2068 during pressing and inverting can be prevented. Further, a plurality of air vents 2242d are provided in the cavity mold 2242 corresponding to the corresponding inner wall portion 2064. Accordingly, the corresponding inner wall portion 2064 can be easily formed thin.

Figure 8:
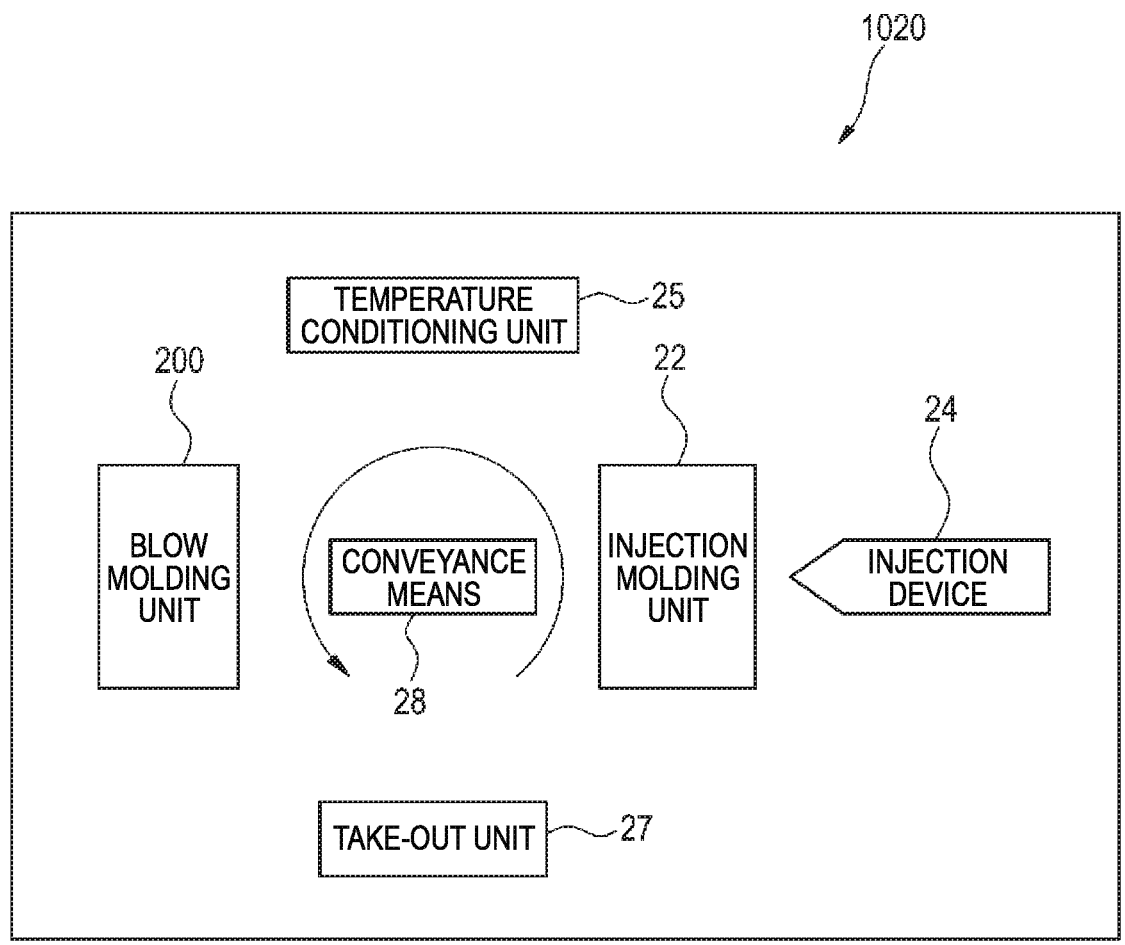
FIG. 8 is a functional block diagram showing a four-station blow molding apparatus.
Figure 9:
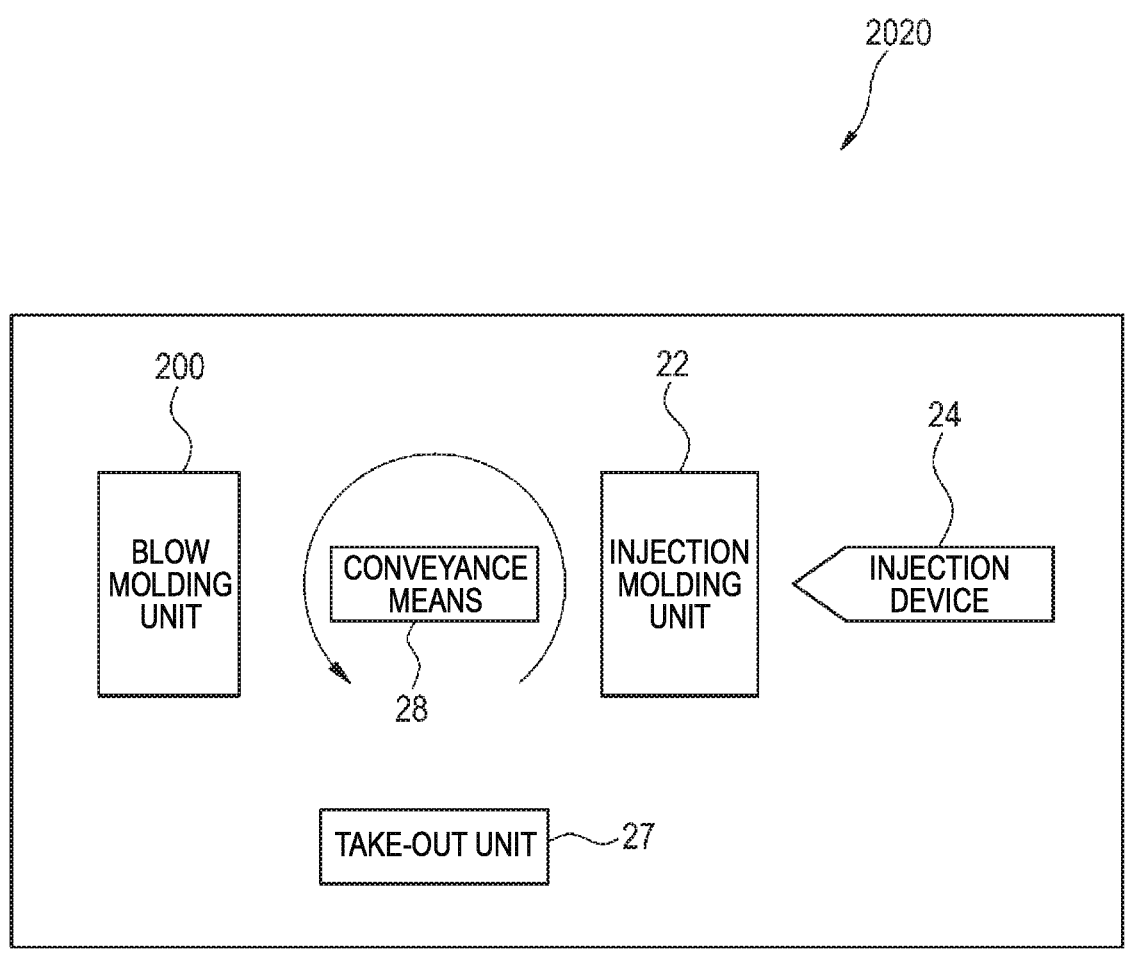
FIG. 9 is a functional block diagram showing a three-station blow molding apparatus.

The blow molding apparatus 20 described in the above embodiment has a mode including the injection molding unit 22 and the blow molding unit 200. In addition to this, the blow molding apparatus 20 may include a temperature conditioning unit for conditioning a temperature of the preform 1 before blowing and a take-out unit for taking out the produced double-wall container 10. Examples thereof include a four-station blow molding apparatus 1020 further including a temperature conditioning unit 25 and a take-out unit 27 as shown in FIG. 8, and a three-station blow molding apparatus 2020 further including the take-out unit 27 as shown in FIG. 9.

In the above embodiment, the double-wall container 10 having the outer wall 12 inclined (tapered) and the intermediate molded product 60 having the corresponding outer wall portion 62 inclined (tapered) have been described. Alternatively, the double-wall container 10 may include the outer wall 12 that extends straight in the upper-lower direction without inclination, and the intermediate molded product 60 may include the corresponding outer wall portion 62 that extends straight in the upper-lower direction without inclination.

The present invention is not limited to the above embodiment and may be modified or improved as appropriate. Materials, shapes, sizes, numerical values, forms, numbers, arrangement places, and the like of components in the above embodiment are optional and not limited as long as the present invention can be achieved.

The present application is based on Japanese Patent Application (No. 2018-067639) filed on Mar. 30, 2018, the entire contents of which are incorporated herein by reference. In addition, all references referred herein are entirely incorporated.

REFERENCE SIGNS LIST

1: preform
2: neck mold
3: lower portion
10: double-wall container
12: outer wall
14: inner wall
16: inner bottom
18: edge
20, 1020, 2020: blow molding apparatus
22: injection molding unit
24: injection device
25: temperature conditioning unit
27: take-out unit
28: conveying means
60, 2060: intermediate molded product
62, 2062: corresponding outer wall portion
64, 2064: corresponding inner wall portion
66: corresponding inner bottom portion
68, 2068: corresponding edge portion
200: blow molding unit
202: stretching rod
240, 1240: mold
242: cavity mold
244, 1244: bottom portion
246, 1246: bottom mold
1248: elevation rod

The invention claimed is:
1. A blow molding method for a double-wall container, the method comprising:

stretch-blowing a resin-made bottomed preform accommodated in a mold to mold an intermediate molded product; and pressing the intermediate molded product inside the mold to mold the double-wall container, wherein the double-wall container includes an inner wall, an outer wall, and an inner bottom, wherein the intermediate molded product includes a corresponding inner wall portion corresponding to the inner wall, a corresponding outer wall portion corresponding to the outer wall, and a corresponding inner bottom portion corresponding to the inner bottom, wherein the corresponding inner wall portion and the corresponding inner bottom portion are formed to bulge out from the corresponding outer wall portion, and wherein, during the pressing, in a state where residual heat of the corresponding inner wall portion and the corresponding inner bottom portion is maintained such that the corresponding inner wall portion is capable of being inverted to be located in an inner side of the corresponding outer wall portion inside the mold, the double-wall container is molded by pressing the corresponding inner bottom portion such that the corresponding inner wall portion formed to bulge out from the corresponding outer wall portion is inverted to be located in the inner side of the corresponding outer wall portion, wherein the pressing is performed without moving the intermediate molded product from a position where the intermediate molded product is molded in the stretch-blowing, and wherein, as the corresponding inner wall portion is being inverted to be located in the inner side of the corresponding outer wall portion, an open space is created between the corresponding inner wall portion and the corresponding outer wall portion around an entire circumference of the double-wall container.

2. A blow molding mold for use in a blow molding unit for producing a resin-made double-wall container from a preform via an intermediate molded product, the double-wall container including an inner wall, an outer wall, and an inner bottom, the intermediate molded product including a corresponding inner wall portion corresponding to the inner wall, a corresponding outer wall portion corresponding to the outer wall, and a corresponding inner bottom portion corresponding to the inner bottom, the corresponding inner wall portion and the corresponding inner bottom portion being formed to bulge out from the corresponding outer wall portion, the mold comprising:

a cavity mold configured to define outer shapes of the corresponding inner wall portion and the corresponding outer wall portion of the intermediate molded product, the intermediate molded product being molded by blowing and stretching the preform with a stretching rod provided in the blow molding unit; and a bottom portion configured to define an outer shape of the corresponding inner bottom portion of the intermediate molded product, wherein, in a state where residual heat of the corresponding inner wall portion and the corresponding inner bottom portion is maintained such that the corresponding inner wall portion is capable of being inverted to be located in an inner side of the corresponding outer wall portion, inside the mold, the bottom portion is capable of pressing the corresponding inner bottom portion such that the corresponding inner wall portion formed to bulge out from the corresponding outer wall portion is inverted to be located in the inner side of the corresponding outer wall portion, wherein, during producing the resin-made double wall container, the intermediate molded product is not moved from the blow molding unit, and wherein, as the corresponding inner wall portion is being inverted to be located in the inner side of the corresponding outer wall portion, an open space is created between the corresponding inner wall portion and the corresponding outer wall portion around an entire circumference of the double-wall container.

3. The blow molding mold according to claim 2, wherein the bottom portion is a bottom mold, and the bottom mold is movable up and down in a stretching direction of the stretching rod.

4. The blow molding mold according to claim 2, wherein the bottom portion includes a bottom mold and an elevation rod attached to the bottom mold, and the elevation rod is movable up and down in a stretching direction of the stretching rod.

5. A blow molding apparatus comprising:

an injection molding unit configured to produce a resin-made bottomed preform; and a blow molding unit configured to produce a resin-made double-wall container, via an intermediate molded product, from the preform produced in the injection molding unit, wherein the blow molding unit includes the mold according to claim 2, and the stretching rod configured to stretch the preform.

* * * * *